United States Patent [19]

Surguchev et al.

[11] Patent Number: 5,022,925

[45] Date of Patent: Jun. 11, 1991

[54] COMPOSITION FOR PREPARING ARTIFICIAL STONE MATERIALS

[76] Inventors: Viktor G. Surguchev, USSR, Simferopol, ulitsa Kievskaya, 153, kv. 187, Simferopol, U.S.S.R.; Oleg V. Kuraev, USSR, Simferopol, ulitsa Rostovskaya, 22, kv. 59, Simferopol, U.S.S.R.; Raisa N. Surgucheva, USSR, Simferopol, ulitsa Kieveskaya, 153, kv. 187, Simferopol, U.S.S.R.; Leonid P. Makhnovsky, USSR, Simferopol, ulitsa Zalesskaya, 81, kv. 201, Simferopol, U.S.S.R.; Anatoly P. Troschenovsky, USSR, Simferopol, ulitsa Dorozhnaya, 9, kv. 45, Simferopol, U.S.S.R.; Alexandr N. Tetior, USSR, Simferopol, ulitsa Gavena, 109, kv. 6, Simferopol, U.S.S.R.; Igor V. Golovchenko, USSR, Simferopol, prospekt Pobedy, 82, kv. 271, Simferopol, U.S.S.R.; Tatyana V. Scherbina, USSR, Simferopol, ulitsa Treneva, 17, kv. 4, Simferopol, U.S.S.R.

[21] Appl. No.: 381,740

[22] PCT Filed: Oct. 5, 1988

[86] PCT No.: PCT/SU88/00198

§ 371 Date: Jun. 13, 1989

§ 102(e) Date: Jun. 13, 1989

[87] PCT Pub. No.: WO89/03370

PCT Pub. Date: Apr. 20, 1989

[51] Int. Cl.$^5$ .............. C04B 12/04; C04B 22/08; C04B 14/28

[52] U.S. Cl. .................. 106/631; 106/624; 106/627; 106/628

[58] Field of Search .............. 106/84, 624, 627, 628, 106/631

[56] References Cited

U.S. PATENT DOCUMENTS

| | | | |
|---|---|---|---|
| 774,003 | 11/1904 | Stowell | 106/84 |
| 1,552,270 | 9/1925 | Burke | 106/84 |
| 1,582,117 | 4/1926 | Blomberg | 106/84 |
| 1,742,794 | 1/1930 | Stoley et al. | 106/84 |
| 2,744,036 | 5/1952 | Pease et al. | 106/84 |
| 3,256,105 | 6/1966 | Alford et al. | 106/84 |
| 3,498,807 | 3/1970 | Gresham | 106/84 |
| 3,874,887 | 4/1975 | Dalmatov et al. | 106/631 |
| 3,970,462 | 7/1976 | Stillman | 106/84 |
| 4,410,365 | 10/1983 | Glukhovsky et al. | 106/84 |
| 4,814,013 | 3/1989 | Guzeau et al. | 106/631 |

FOREIGN PATENT DOCUMENTS

| | | | |
|---|---|---|---|
| 722872 | 3/1980 | U.S.S.R. | 106/84 |
| 539353 | 9/1941 | United Kingdom | 106/84 |

*Primary Examiner*—Theodore Morris
*Assistant Examiner*—David M. Brunsman
*Attorney, Agent, or Firm*—Lilling and Lilling

[57] ABSTRACT

A composition for preparing artificial stone materials has the following formulation (mass %):
soluble glass: 3-65
limestone: 1-75
aqueous solution of an acid with pH 1-4: 5-52

This composition ensures the production of a wide range of high-strength structural and heat insulating materials.

7 Claims, No Drawings

COMPOSITION FOR PREPARING ARTIFICIAL STONE MATERIALS

BACKGROUND OF THE INVENTION

1. Field of the Invention

The present invention relates to building materials on a cement-free base and more particularly to a composition for preparing artificial stone materials.

2. Description of the Related Art

Known in the art is a composition for preparing construction stone materials (SU, A, 808470), having the following formulation (mass %):

boric acid: 10–20
limestone: 70–80
water: up to 100

The material prepared from such a composition has a high ultimate compressive strength, 63.0 MPa, but features an enhanced brittleness, since it has a low ultimate bending strength, 7.0 MPa. For this reason this material has a limited application.

A composition is known for preparing construction artificial stone materials (SU, A, 464560), having the following formulation (mass %):

liquid glass: 15–25
ash: 10–30
aluminium powder: 0.003–0.005
limestone: up to 100

Liquid glass, having a constant sodium silicate component/water ratio, fails to ensure high strength characteristics of the materials prepared from such a composition (ultimate compressive strength, 42.0 MPa; ultimate bending strength, 10.0 MPa; the frost resistance of the material does not exceed 100 cycles). Such a composition is poorly adaptable to the method of semi-dry pressing, since liquid glass, because of its viscosity, is difficult to mix with dry components and is liable to segregation upon prolonged storage.

A composition is known for preparing a heat insulating material (SU, A, 863575), comprising the following components (mass %):

liquid glass: 92–95.5
dry silica: 1.5–2.4
boric acid: 3.0–6.0

The material prepared from this composition is characterized by a low heat conductivity ($\lambda = 0.06$ W/m·K) due to the average density of up to 200 kg/m$^3$, but it has low ultimate compressive strength, 0.41 MPa, and ultimate bending strength, 0.08 MPa, which limits its application as a building heat insulating material. The coefficient of water resistance is smaller than 0.5, so that the material cannot be used in a medium with an elevated humidity.

Also known is a composition for preparing refractory stone materials (SU, A, 763280), comprising the following components (mass %):

cullet: 20–50
basic blast furnace slag: 50–80

The material prepared from this composition by sintering at a temperature of up to 750° C. with an average density of 1800 kg/cm$^3$ is characterized by the ultimate compressive strength of 21 MPa and ultimate bending strength of 2 MPa, which become appreciably reduced at a temperature above 800° C., so that the application of this material, for instance, as heat-resistant blocks or high-temperature insulation for industrial units and equipment, is limited, insofar as the service temperature of these items exceeds 1000° C.

The main object of the invention is to provide such a composition for preparing artificial stone materials by appropriate qualitative and quantitative selection of the components, which would ensure enhanced compressive and bending strength characteristics of said materials under different service temperature conditions, as well as a low heat conductivity thereof.

SUMMARY OF THE INVENTION

Said object is accomplished by the provision of a composition for preparing artificial stone materials, comprising a silicate component and limestone, which, according to the invention, additionally comprises an aqueous solution of an acid with pH 1–4, and as the silicate component it comprises liquid glass with the following ratio of the components (mass %):

soluble glass: 3–65
limestone: 1–75
aqueous solution of an acid with pH 1–4: 5–52

Such a composition, depending on the ratio of the components, ensures the preparation of a wide range of high-strength construction materials with improved frost-resistance and water-resistance characteristics. The use of soluble glass and such an aqueous acid solution in the composition provides a possibility for preparing materials by using the techniques of semidry pressing, casting, vibrocompacting, and extrusion for shaping thereof. With a decrease of the amount of soluble glass and an increase of the amount of limestone in the composition, the resulting construction material is characterized by the following parameters:

average density, kg/m$^3$: 1000–2100
ultimate compressive strength, MPa: 5.0–78.0
ultimate bending strength, MPa: 3.0–30.0
frost resistance, cycles: up to 400

An increase of the content of liquid glass and a decrease of the content of limestone in the composition make it possible to prepare a heat insulating material with the following characteristics:

average density, kg/m$^3$: 100–10000
ultimate compressive strength, MPa: 0.3–20.0
ultimate bending strength, MPa: 0.3–9.0
heat conductivity, W/m·K: 0.035–0.21

It is recommended that for preparing heat insulating and construction materials with high strength characteristics a composition should be used comprising also a silicate component with the content of silicon dioxide exceeding 60 mass %, with the following ratio of the components (mass %):

soluble glass: 3–40
silicate component with the content of silicon dioxide exceeding 60 mass %: 1–70
limestone: 1–70
aqueous acid solution with pH 1–4: 5–52

For construction materials with optimal strength characteristics it is expedient to use a composition having the following formulation (mass %):

soluble glass: 9–15
silicate component with the content of silicon dioxide exceeding 60 mass %: 1–70
limestone: 1–70
aqueous acid solution with pH 2–4: 5–52

For preparing a material with optimal heat insulating properties, high coefficient of water resistance, and strength parameters, it is reasonable to use a composition of the following formulation (mass %):

soluble glass: 20–40
silicate component with the content of silicon dioxide exceeding 60 mass %: 20–40
limestone: 2–10
aqueous acid solution with pH 1–3: 5–52

As said silicate component it is desirable to use cullet or tripoli clays and as said aqueous acid solution, waste water of different acid-manufacturing processes. The introduction of such components into the composition makes the latter appreciably cheaper and makes it possible to utilize industrial wastes, while preserving high strength characteristics of the material prepared from the composition.

Furthermore, the heat-resistant properties of the material become higher, that is, the material retains its working strength on compression at the temperature of 1000° C.

For preparing materials with good heat-resistant properties at a temperature above 1000° C., it is desirable to use a composition comprising additionally a basic blast furnace slag, with the following ratio of the components (mass %):
soluble glass: 3–5
silicate component with the content of silicon dioxide exceeding 60 mass %: 15–50
limestone: 20–60
basic blast furnace slag: 10–30
aqueous acid solution with pH 1–2: 5–52

DESCRIPTION OF THE PREFERRED EMBODIMENTS

The preparation of the composition, according to the invention, is effected as follows. A mixture is prepared from dry ground components with the fineness of grinding up to 2000 cm$^2$/g, using for this purpose, depending on the formulation, soluble glass in the form of silicate lump, limestone, a silicate component with the content of silicon dioxide exceeding 60 mass %, and basic blast furnace slag.

Quantitative selection of the components is defined by the prescribed physico-mechanical characteristics of the resulting composition and of the artificial stone material prepared therefrom. The prepared mixture is combined and stirred with the aqueous acid solution having pH of 1–4.

The soluble glass employed in the form of silicate lump differs from liquid glass in that it is a stock material for producing the latter.

As ground limestone, use is made of wastes resulting in sawing of building limestones, whose fraction is less than 0.14 mm, comprising (mass %): 49.23–52.3 CaO, 87.6–94 CaCO$_3$, 0.25–1.07 MgO, 0.52–2.23 MgCO$_3$, 2.86–8.1 SiO$_2$, 0.26–2.06 Fe$_2$O$_3$, 0.2–1.12 Al$_2$O$_3$, 0.05–0.16 SO$_3$, 0.04–0.59 K$_2$O+Na$_2$O.

Silicate components comprising more than 60 mass % of silicon dioxide can be either wastes of glass-making or tripoli clays with the specific surface of particles less than 2000 cm$^2$/g.

Wastes of glass-making comprise (mass parts): 73.2–60.3 SiO$_2$; Al$_2$O$_3$+Fe$_2$O$_3$ 12.0+1.2 CaO+MgO 12.3+9.0; Na$_2$O+K$_2$O 13.1+15.7 SO$_3$ 0.3–0.5 Mn$_3$O$_4$ 0.5–1.5; Cr$_2$O$_3$ 0.05–0.13.

An aqueous acid solution with pH 1–3 is a solution of boric, nitric, sulphuric, acetic acids or waste water of different acid-producing processes.

Basic blast furnace slag has a composition (mass parts): 41.24–35.71 SiO$_2$; 2.72–11.5 Al$_2$O$_3$; 0.4–2.8 Fe$_2$O$_3$; 34.9–47.13 CaO; 11.25–2.8 MgO; 0.66–2.6 SO$_3$; 0.36–5.2 MnO; up to 0.7 TiO$_2$.

The composition thus prepared, depending on the method employed, is shaped, compacted, and subjected to drying at the temperature of 250° C. during 4–8 hours. The resulting material is tested for ultimate compressive strength and ultimate bending strength at the temperature of 1000° C., its average density, heat conductivity, water resistance coefficient, and frost resistance are determined by following conventional procedures.

The essence of producing artificial stone materials, according to the invention, resides in the formation of silicic acid in the form of a winding film component when soluble glass is subjected to the effect of an aqueous acid solution with pH 1–4 during heat treatment. In this case a boundary interaction of this film with carbonate rock and formation of carbonate-silicate compounds occur, the latter strengthening the spatial skeleton of the resultant conglomerate. The mechanism of interaction of the acid introduced into the composition with other components is as follows. Upon introduction of the acid solution into the composition, dissolution of sodium silicate alongside of its hydrolysis with the formation of a silicic acid sol occurs. In the course of time and with temperature changes coagulation of the sol takes place and a gel possessing binding properties is formed. Since the course of hydrolysis proceeding with a sufficient speed depends only on the concentration of H$^+$, the nature of the acid is not essential for the characteristics of the shaped stone material, these characteristics being determined only by the pH values of the acid solution introduced. The use of aqueous solutions of acids with pH 1–4 is dictated by two factors. If pH is lower than 1, in said composition gel formation occurs directly on the surface of sodium silicate, and the process does not develop in the bulk; as a result, the strength of the produced artificial material diminishes sharply. Furthermore, dissolution of the limestone takes place, and this lowers the activating effect of H$^+$ on sodium silicate. In the case of pH higher than 4 hydrolysis proceeds only slightly because of a low concentration of H$^+$; as a result, the strength characteristics of the stone materials produced do not attain the required values. Since the concentration of H$^+$, necessary for the process, is defined only in the system of pH 1–4, it is possible to use organic and inorganic acids, different in the degree of hydrolysis.

Specific examples illustrating the embodiment of the present invention are given hereinbelow.

EXAMPLE 1

Dry ground components are mixed: soluble glass in the form of silicate lump, limestone, having the specific surface of up to 2000 cm$^2$/g. Dry mixture is combined and stirred with an aqueous solution of boric acid with pH 1–4. From compositions whose formulations differ in the content of said components 4×4×15 cm samples are shaped by placing them into moulds, this being followed by vibration and heat treatment at the temperature of 250° C. for 5 hours. From the composition of formulation 5, presented hereinbelow in Table 1, samples are prepared by pressing at the pressure of 10 MPa and subsequent drying at the temperature of 250° C. for 5 hours. The samples are cooled, and then their average density, ultimate compressive strength, ultimate bending strength, water resistance coefficient, and frost resistance are determined.

The formulations of the prepared compositions and the physico-mechanical properties of artificial stone materials produced therefrom are listed in Table 1.

The compositions with formulations 1-5 are recommendable to use for preparing heat insulating stone materials, whereas those with formulations 6-10 are preferable for preparing structural stone materials.

TABLE 1

| Composition formulation No. | Content of components, mass % | | | Average density, kg/m³ | Ultimate strength, MPa | | Frost resistance, cycles | Water resistance coefficient |
|---|---|---|---|---|---|---|---|---|
| | Soluble glass (silicate lump) | Limestone | Aqueous solution of boric acid (pH) | | compressive | bending | | |
| 1 | 65 | 20 | 15(2) | 240 | 0.70 | 0.83 | 58 | 0.92 |
| 2 | 55 | 10 | 35(3) | 144 | 0.86 | 1.07 | 18 | 0.94 |
| 3 | 45 | 20 | 35(3) | 220 | 0.60 | 0.75 | 27 | 0.93 |
| 4 | 47 | 1 | 52(4) | 131 | 0.30 | 0.42 | 21 | 0.90 |
| 5 | 20 | 75 | 5(1) | 2100 | 76.0 | 26.0 | 410 | 0.92 |
| 6 | 1 | 74 | 25(2) | 1800 | 50.0 | 17.0 | 289 | 0.88 |

It is expedient to use formulations 1-4 for producing heat-insulating materials and formulations 5-6 for producing building materials having an enhanced frost resistance.

EXAMPLE 2

Dry ground components with the specific surface of 2000 cm²/g are mixed: silicate lump, limestone, and solicate component with the content of silicon dioxide exceeding 60 mass %. Dry mixture is combined and stirred with an aqueous solution of an acid with pH 1-4. The resulting compositions whose formulations differ in the content of said components in them are distributed into moulds and subjected to heat treatment at the temperature of 250° C. for 5 hours. The material thus produced is subjected to physico-mechanical tests.

The formulations of the compositions and the physicomechanical properties of the artificial stone materials made therefrom are listed in Table 2.

EXAMPLE 3

Ground components with the specific surface of up to 2000 g/cm² are mixed: silicate lump, limestone, silicate component with silicon dioxide content more than 60 mass %, basic blast furnace slag. Dry mixture is combined and stirred with an aqueous solution of nitric acid with pH 1-2. The composition thus prepared is moulded under the pressure of 10 MPa into 25.0×12.5×6.5 cm samples. The samples are dried at the temperature of 120° C. for 6 hours and subjected to roasting in a muffle furnace at the temperature of 1000° C. for 2 hours. After cooling the stone material thus produced, its physicomechanical properties are determined.

The formulations of the compositions, comprising said components in different amounts, and the physicomechanical properties of the stone materials

TABLE 2

| Formulation No. | Content of components, mass % | | | | Average density, kg/cm³ | Ultimate strength, MPa | | Water resistance coefficient | Heat conductivity, W/m·K |
|---|---|---|---|---|---|---|---|---|---|
| | Limestone | Soluble glass (silicate lump) | Silicate component, over 60 mass % SiO₂ | Aqueous solution of acid (pH) | | compressive | bending | | |
| 1 | 2 | 3 | 4 | 5 | 6 | 7 | 8 | 9 | 10 |
| 1 | 2 | 20 | cullet 40 | sulphuric acid 38(4) | 600 | 5.2 | 2.4 | 0.94 | 0.13 |
| 2 | 10 | 40 | 20 | 30(3) | 600 | 4.8 | 2.8 | 0.93 | 0.12 |
| 3 | 6 | 30 | 30 tripoli clay | 34(4) nitric acid | 400 | 5.2 | 3.0 | 0.94 | 0.09 |
| 4 | 6 | 30 | 30 | 34(4) | 350 | 5.3 | 2.2 | 0.94 | 0.07 |
| 5 | 8 | 35 | 25 | 32(3) | 500 | 5.0 | 3.1 | 0.94 | 0.10 |
| 6 | 1 | 9 | cullet 70 | 20(2) | 2000 | 18.9 | 9.5 | 0.90 | 0.61 |
| 7 | 64 | 15 | 1 | 20(2) | 1800 | 18.8 | 10.9 | 0.90 | 0.58 |
| 8 | 70 | 9 | 1 | 20(3) | 2000 | 16.3 | 10.7 | 0.78 | 0.58 |
| 9 | 30 | 11 | 40 tripoli clay | 19(1) acetic acid | 1900 | 35.2 | 16.7 | 0.90 | 0.58 |
| 10 | 30 | 10 | 40 | 20(2) | 1900 | 34 | 16.8 | 0.88 | 0.55 | manufactured therefrom are listed in Table 3.

TABLE 3

| Composition formulation No. | Content of components, mass % | | | | Aqueous solution of HNO₃ (pH) | Average density, kg/m³ | Ultimate strength, MPa | | |
|---|---|---|---|---|---|---|---|---|---|
| | Limestone | Soluble glass (silicate lump) | Silicate component, over 60 mass % SiO₂ | Basic blast furnace slag | | | compressive at 1000° C. | compressive | bending |
| 1 | 2 | 3 | 4 | 5 | 6 | 7 | 8 | 9 | 10 |
| 1 | 20 | 3 | cullet 17 | | 10(1) | 2310 | 2 | 10.7 | 3.1 |

TABLE 3-continued

| Composition formulation No. | Limestone | Soluble glass (silicate lump) | Silicate component, over 60 mass % SiO$_2$ | Basic blast furnace slag | Aqueous solution of HNO$_3$ (pH) | Average density, kg/m$^3$ | Ultimate strength, MPa compressive at 1000° C. | compressive | bending |
|---|---|---|---|---|---|---|---|---|---|
| 1 | 2 | 3 | 4 | 5 | 6 | 7 | 8 | 9 | 10 |
|  |  |  | 50 |  |  |  |  |  |  |
| 2 | 30 | 5 | 25 | 30 | 10(2) | 2200 | 1 | 29.8 | 10.0 |
| 3 | 40 | 4 | 32 | 14 | 10(1) | 2290 | 1 | 30.0 | 9.8 |
| 4 | 45 | 5 | 30 | 10 | 10(2) | 2300 | 1 | 25.2 | 10.2 |
| 5 | 60 | 5 | tripoli clay 15 | 10 | 10(1) | 2430 | 1 | 10.1 | 3.2 |

Materials made from the herein-proposed composition will find extensive application in the manufacture of building and technological structures, heat insulating coatings, heat-resistant elements and facing plates.

What is claimed is:

1. A composition for preparing artificial stone materials, consisting of a silicate component, limestone, and an aqueous solution of an acid with pH 1-4, said silicate component consisting of soluble glass, said composition having the following ratio of the components (mass %):
   soluble glass: 3-65
   limestone: 1-75
   aqueous solution of an acid with pH 1-4: 5-52.

2. A composition according to claim 1, further consisting of a silicate component with the content of silicon dioxide exceeding 60 mass %, with the following ratio of the components (mass %);
   soluble glass: 3-40
   silicate component with the content of silicon dioxide exceeding 60 mass %: 1-70
   limestone: 1-70
   aqueous solution of an acid with pH 1-4: 5-52.

3. A composition according to claim 2, consisting of components with the following ratio thereof (mass %):
   soluble glass: 9-15
   silicate component with the content of silicon dioxide exceeding 60 mass %: 1-70
   limestone: 1-70
   aqueous solution of an acid with pH 2-4: 5-52.

4. A composition according to claim 2, consisting of components with the following ratio thereof (mass %):
   soluble glass: 20-40
   silicate component with the content of silicon dioxide exceeding 60 mass %: 20-40
   limestone: 2-10
   aqueous solution of an acid with pH 1-3: 5-52.

5. A composition according to claim 2, wherein said silicate component consists of wastes of glass-making process or tripoli clays.

6. A composition according to claim 2, further consisting of basic blast furnace slag, with the following ratio of the components (mass %):
   soluble glass: 3-5
   silicate component with the content of silicon dioxide exceeding 60 mass %: 15-50
   limestone: 20-60
   basic blast furnace slag: 10-30
   aqueous solution of an acid with pH 1-2: 5-52.

7. A composition according to claim 1, wherein said aqueous solution of an acid with pH 1-4 consists of waste water of acid-manufacturing processes.

* * * * *